(12) United States Patent
Hao et al.

(10) Patent No.: US 10,992,409 B2
(45) Date of Patent: Apr. 27, 2021

(54) WIRELESS SIGNAL TRANSMISSION METHOD AND DEVICE

(71) Applicant: ZTE CORPORATION, Guangdong (CN)

(72) Inventors: Peng Hao, Shenzhen (CN); Junfeng Zhang, Shenzhen (CN); Feng Bi, Shenzhen (CN); Zhaohua Lu, Shenzhen (CN); Liujun Hu, Shenzhen (CN); Xinhui Wang, Shenzhen (CN); Gang Bai, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 75 days.

(21) Appl. No.: 16/324,021

(22) PCT Filed: Aug. 10, 2017

(86) PCT No.: PCT/CN2017/096759
§ 371 (c)(1),
(2) Date: Apr. 9, 2019

(87) PCT Pub. No.: WO2018/028621
PCT Pub. Date: Feb. 15, 2018

(65) Prior Publication Data
US 2019/0253183 A1    Aug. 15, 2019

(30) Foreign Application Priority Data
Aug. 12, 2016 (CN) .......................... 201610666759.2
Nov. 4, 2016 (CN) .......................... 201610978148.1

(51) Int. Cl.
*H04L 1/00* (2006.01)
*H04W 72/04* (2009.01)
*H04L 27/26* (2006.01)

(52) U.S. Cl.
CPC ........ *H04L 1/0023* (2013.01); *H04L 27/2605* (2013.01); *H04W 72/044* (2013.01)

(58) Field of Classification Search
None
See application file for complete search history.

(56) References Cited

U.S. PATENT DOCUMENTS 10,855,509 B2 * 12/2020 Xue ...................... H04L 25/061
2009/0285337 A1 * 11/2009 Cheng .................... H04L 23/02
375/343

(Continued)

FOREIGN PATENT DOCUMENTS

CN    101902427 A    12/2010
CN    102316591 A    1/2012
(Continued)

OTHER PUBLICATIONS

International Search Report and Written Opinion for International Appl. No. PCT/CN2017/096759, dated Sep. 28, 2017.

*Primary Examiner* — Edan Orgad
*Assistant Examiner* — Emmanuel K Maglo
(74) *Attorney, Agent, or Firm* — Foley & Lardner LLP (57) ABSTRACT

Provided in embodiments of the present disclosure is a wireless signal transmission method and device. The method includes: in presence of a plurality of sets of wireless signals having different configurations, cascading consecutive symbols in each of the plurality of sets of wireless signals into at least one symbol cascade block, where when lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers; and (Continued)

transmitting symbol cascade blocks of the plurality of sets of wireless signals in a preset order.

14 Claims, 3 Drawing Sheets

(56) References Cited

U.S. PATENT DOCUMENTS

| | | | | |
|---|---|---|---|---|
| 2010/0073190 | A1* | 3/2010 | Fanini | E21B 47/12 340/855.7 |
| 2011/0103499 | A1* | 5/2011 | Cheng | H04W 56/0045 375/260 |
| 2011/0299572 | A1 | 12/2011 | Monsen et al. | |
| 2015/0230211 | A1* | 8/2015 | You | H04W 72/04 370/330 |
| 2015/0280876 | A1* | 10/2015 | You | H04L 1/1812 370/329 |
| 2016/0269162 | A1* | 9/2016 | Zhao | H04L 5/0053 |
| 2016/0373222 | A1* | 12/2016 | Pralea | H04L 27/2636 |
| 2017/0094655 | A1* | 3/2017 | Dai | H04L 5/14 |
| 2017/0338920 | A1* | 11/2017 | Kim | H04L 1/1829 |
| 2019/0074940 | A1* | 3/2019 | Ahn | H04W 72/04 |
| 2019/0075006 | A1* | 3/2019 | Yi | H04L 27/2602 |

FOREIGN PATENT DOCUMENTS

| | | | |
|---|---|---|---|
| CN | 103916900 | A | 7/2014 |
| CN | 105827385 | A | 8/2016 |

* cited by examiner

In presence of a plurality of sets of wireless signals having different configurations, cascade consecutive symbols in each of the plurality of sets of wireless signals into at least one symbol cascade block, where when lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers ⌒ S302

Transmit symbol cascade blocks of the plurality of sets of wireless signals in a preset order ⌒ S304

WIRELESS SIGNAL TRANSMISSION METHOD AND DEVICE

CROSS-REFERENCE TO RELATED APPLICATIONS

This is a National Stage Application, under 35 U.S.C. 371, of International Patent Application No. PCT/CN2017/096759, filed on Aug. 10, 2017, which claims priority to Chinese Patent Application No. 201610666759.2, filed on Aug. 12, 2016 and Chinese Patent Application No. 201610978148.1, filed on Nov. 4, 2016, the contents of all of which are incorporated herein by reference in their entireties.

TECHNICAL FIELD

The present disclosure relates to the field of communications and, in particular, to a wireless signal transmission method and device.

BACKGROUND

In a new generation mobile communication system, new radio (NR), services like enhanced mobile broadband (eMBB), ultra-reliable and low-latency communications (URLLC), and massive machine type communication (mMTC) need to be supported. The system networking is to be implemented with a carrier frequency lower than 6 GHz or higher than 6 GHz. Currently, frequency bands widely recognized by the industry and international organizations are mainly 3 GHz to 6 GHz and 6 GHz to 100 GHz. These frequency bands substantially belong to the centimeter wave band and the millimeter wave band. Studies show that the phase noise of a radio frequency (RF) device is quite high at a frequency between 6 GHz and 100 GHz, especially at a higher frequency. Such phase noise may be resisted with an increase in the subcarrier width of the orthogonal frequency division multiple access system. The high frequency is significantly different from the lower frequency bands in propagation characteristic. Since the propagation loss in the high frequency band is significantly larger than the propagation loss in the low frequency band, the coverage area of the high frequency band is generally much smaller than the coverage area of the low frequency band. A smaller coverage area generally goes with a smaller delay spread of the channel, and the corresponding coherence bandwidth is larger than the coherent bandwidth in the low frequency band range of 300 M to 3000 M. The increased subcarrier width with respect to the subcarrier width in the Long Term Evolution (LTE) system may still satisfy the design requirement on the subcarrier spacing within the coherent bandwidth. Therefore, the subcarrier spacing (SCS) (equivalent to the subcarrier width) needs to be adjusted according to the carrier frequency, and the adjustment is feasible and reasonable.

The NR system covers the carrier frequency from sub 6 G up to 100 G. Different frame structure parameters of the subcarrier spacing need to be used to adapt to the carrier frequency, that is, the frame structure design parameters at each carrier frequency are different. For example, the closer the frequency is to the core frequency of LTE, the closer the typical frame structure parameters such as subcarrier spacing are to the existing parameters of LTE. The higher the frequency is, the larger the subcarrier spacing is.

The frame structure parameters may be different at different frequencies in different systems. Moreover, even in NR systems at the same frequency, the subcarrier spacing parameters may also be different for different types of services. For example, the URLLC service, which emphasizes low latency, has shorter symbols and a larger subcarrier spacing than eMBB. In contrast, the mMTC service, which has a service demand biased towards massive access and deep coverage, may have a much smaller subcarrier spacing and much longer symbol than the eMBB service. Multiple types of services are multiplexed on the same carrier, making the frame structure parameters in a system more complicated.

A change of the subcarrier spacing (SCS), which is an important frame structure parameter, accordingly affects the lengths of the symbols in the multiple access system such as the length of orthogonal frequency division multiplexing (OFDM) and the length of the cyclic prefix (CP).

A conventional processing method is based on the current frame structure of LTE, and performs the scalable frame structure parameter change. This change is called Scalable. For example, the subcarrier spacing currently under study may be selected to be 15 kHz, 30 kHz, 60 kHz, 75 kHz, 120 kHz up to 240 kHz, or less than 15 kHz. Moreover, the above parameters are varied according to an integer multiple of the scaling factor. However, LTE frame structure parameters are special, that is, among seven symbols in the slot of 0.5 ms in LTE, the first symbol is a long symbol, and the other six symbols are short symbols. To ensure coexistence with the Time Division (TD)-LTE system, frame structure parameter scaling is generally based on the length of an interval (usually a subframe of 1 ms), which ensures that the NR system and the TD-LTE system are aligned on an 1 ms boundary, and that the interference between uplink and downlink caused by coexistence is avoided.

Figure 1:
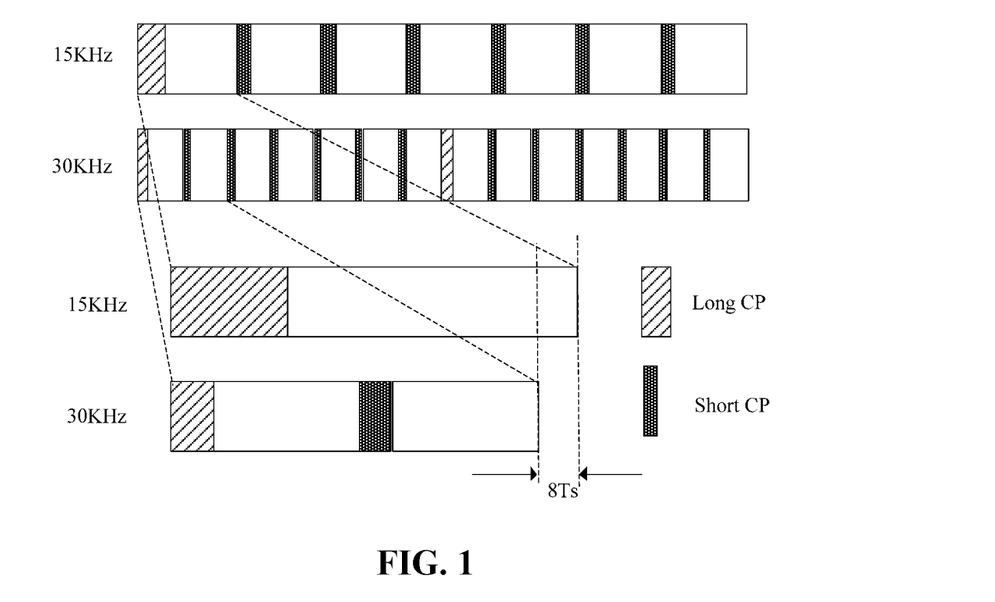
FIG. 1 is a schematic diagram of frame structures corresponding to different subcarrier spacing parameters according to the related art.

However, the frame structure parameter scaling in the NR system is performed based on the subframe length of 1 ms and the LTE slot is composed of one long symbol and six short symbols, so frame structures corresponding to different subcarrier spacing parameters cannot be aligned at the edge of the symbols when integer multiple scaling is performed. FIG. 1 is a schematic diagram of frame structures corresponding to different subcarrier spacing parameters according to the related art. In FIG. 1, the frame is scaled based on 1 ms, and symbols of the frame structures corresponding to the different parameters cannot be aligned. As shown in FIG. 1, when the subcarrier spacing is 15 kHZ, the LTE slot has 7 symbols. When the subcarrier spacing is adjusted to 30 kHz, within the same 0.5 ms, the seven symbols are formed by compressing 14 symbols in the original 1 ms subframe by 1 time. It can be easily calculated that the end of the first symbol of 15 kHz and the end of the second symbol of 30 KHz are misaligned, with a difference of 8 Ts, about 0.26 us.

Figure 2:
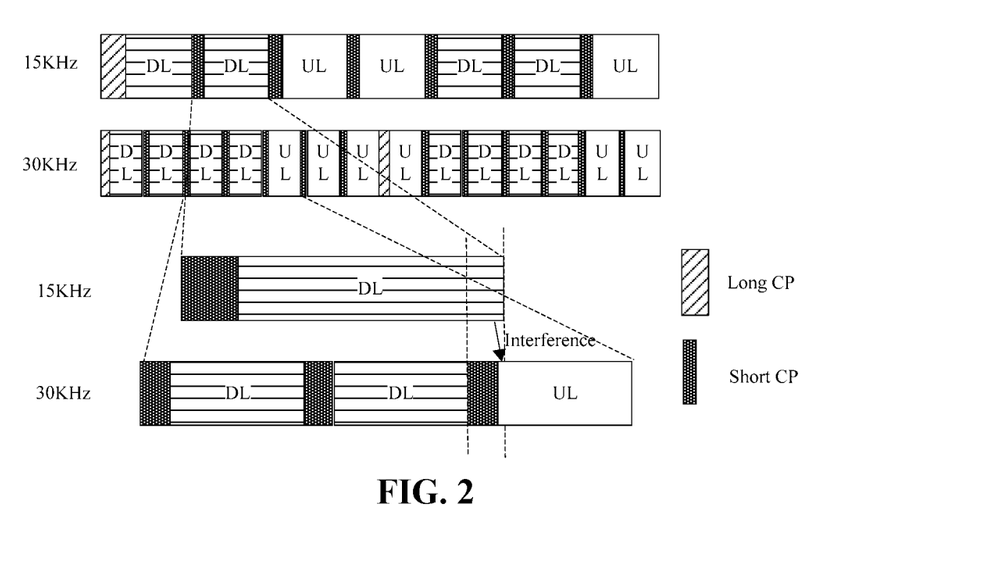
FIG. 2 is a schematic diagram of interference between uplink and downlink when symbols are not aligned according to the related art.

FIG. 2 is a schematic diagram of interference between uplink and downlink when symbols are not aligned according to the related art. When a plurality of sets of frame structure parameters coexist in the system in a frequency division multiplexing (FDM) manner, for example, as shown in FIG. 2, when two sets of frame structure parameters, 15 kHz and 30 kHZ frame structure parameters, coexist, and if a time division duplexing (TDD) mode is adopted, the uplink and downlink switching points of TDD are the integer symbol length units, for example, the second symbol in the 15 KHz frame structure is in the downlink, the third and fourth symbols in the 30 KHz frame structure are in the downlink, the 5th symbol in the 30 KHz frame structure is in the uplink, and the second symbol in the 15 KHz frame structure will interfere with the fifth symbol in the 30 KHz frame structure at the edge of the end of the second symbol, that is, at the misaligned position.

In the related art the symbol misalignment is easy to occur when different subcarrier spacing parameters exist, which causes interference between uplink and downlink.

SUMMARY

Embodiments of the present disclosure provide a wireless signal transmission method and device.

An embodiment of the present disclosure provides a wireless signal transmission method. The method includes: in presence of a plurality of sets of wireless signals having different configurations, cascading consecutive symbols in each of the plurality of sets of wireless signals into at least one symbol cascade block, where when lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers; and transmitting symbol cascade blocks of the plurality of sets of wireless signals in a preset order.

In an embodiment, symbols in each of the symbol cascade blocks have a same transmission direction type.

In an embodiment, symbols in each of the symbol cascade blocks have a same function type.

In an embodiment, the function type includes one of: a downlink control symbol, a downlink data symbol, an uplink control symbol, or an uplink data symbol.

In an embodiment, the wireless signals having different configurations comprise at least one of: wireless signals having different subcarrier spacings; wireless signals having different symbol lengths; or wireless signals having different cyclic prefix lengths.

In an embodiment, among the wireless signals having different configurations, a relative relationship of the length of each symbol in symbol cascade blocks of a wireless signal having a small subcarrier spacing is the same as a relative relationship of a total length of symbols of the number of a scale factor in symbol cascade blocks of a wireless signal having a large subcarrier spacing.

In an embodiment, the relative relationship includes: in a case where a symbol in the symbol cascade blocks having the small subcarrier spacing is a long symbol, and corresponding symbols of the number of the scale factor in the symbol cascade blocks having the large subcarrier spacing are also long symbols; and in a case where a symbol in the symbol cascade blocks having the small subcarrier spacing is a short symbol, and corresponding symbols of the number of the scale factor in the symbol cascade blocks having the large subcarrier spacing are also short symbols.

In an embodiment, the relative relationship includes: in a case where a symbol in the symbol cascade blocks having the small subcarrier spacing is a long symbol, and at least one corresponding symbol in the symbol cascade blocks having the large subcarrier spacing is also a long symbol.

In an embodiment, the symbols having the same transmission direction type in the each of the symbol cascade blocks include one of: symbols in a downlink transmission direction in the each of the symbol cascade blocks; symbols in the downlink transmission direction and blank time in the each of the symbol cascade blocks; symbols in an uplink transmission direction in the each of the symbol cascade blocks; or symbols in the uplink transmission direction and the blank time in the each of the symbol cascade blocks.

In an embodiment, the symbols having the same transmission direction type in the plurality of sets of wireless signals having different configurations have different lengths.

In an embodiment, the lengths of the symbols having the same transmission direction type in the plurality of sets of wireless signals having different configurations are obtained in at least one manner of a group consisting of: obtaining, based on a received configuration parameter, the lengths of the symbols in the plurality of sets of wireless signals having different configurations; and obtaining, based on a subcarrier spacing (SCS), lengths of valid symbols among symbols corresponding to the subcarrier spacing (SCS) in the plurality of sets of wireless signals having different configurations, and obtaining the lengths of the corresponding symbols in the plurality of sets of wireless signals having different configurations according to the lengths of the valid symbols, where the length of each symbol is obtained by adding the length of the valid symbol in the each symbol and the length of a prefix.

In an embodiment, the symbols in the each of the plurality of sets of wireless signals having different configurations have at least two different lengths, where in a case where the symbols in the each of the plurality of sets of wireless signals having different configurations have two different lengths, the symbols include long symbols and short symbols, and the plurality of sets of wireless signals have a same proportional relationship between the length of each long symbol and the length of each short symbol.

In an embodiment, cascading the consecutive symbols in the each of the plurality of sets of wireless signals into the symbol cascade block includes: cascading the preset number of symbols in the each of the plurality of sets of wireless signals into the symbol cascade block, where the preset number is the number of symbols of the each of the plurality of sets of wireless signals within a unit time interval and having a basic subcarrier spacing.

In an embodiment, transmitting the symbol cascade blocks in the preset order includes: sending the symbol cascade blocks within a unit time interval in sequence.

In an embodiment, the valid symbols are orthogonal frequency division multiplexing (OFDM) symbols.

Another embodiment of the present disclosure further provides a wireless signal transmission device. The device includes a cascading module and a transmission module. The cascading module is configured to, in presence of a plurality of sets of wireless signals having different configurations, cascade consecutive symbols in each of the plurality of sets of wireless signals into at least one symbol cascade block, where when lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers. The transmission module is configured to transmit symbol cascade blocks of the plurality of sets of wireless signals in a preset order.

In an embodiment, symbols in each of the symbol cascade blocks have a same transmission direction type.

In an embodiment, symbols in each of the symbol cascade blocks have a same function type.

In an embodiment, the function type includes one of: a downlink control symbol, a downlink data symbol, an uplink control symbol, or an uplink data symbol.

In an embodiment, the wireless signals having different configurations comprise at least one of: wireless signals having different subcarrier spacings; wireless signals having different symbol lengths; or wireless signals having different cyclic prefix lengths.

In an embodiment, among the wireless signals having different configurations, a relative relationship of the length of each symbol in symbol cascade blocks of a wireless signal having a small subcarrier spacing is the same as a relative relationship of a total length of symbols of the number of a scale factor in symbol cascade blocks of a wireless signal having a large subcarrier spacing.

In an embodiment, the relative relationship includes: in a case where a symbol in the symbol cascade blocks having the small subcarrier spacing is a long symbol, and corresponding symbols of the number of the scale factor in the symbol cascade blocks having the large subcarrier spacing are also long symbols; and in a case where a symbol in the symbol cascade blocks having the small subcarrier spacing is a short symbol, and corresponding symbols of the number of the scale factor in the symbol cascade blocks having the large subcarrier spacing are also short symbols.

In an embodiment, the relative relationship includes: in a case where a symbol in the symbol cascade blocks having the small subcarrier spacing is a long symbol, and at least one corresponding symbol in the symbol cascade blocks having the large subcarrier spacing is also a long symbol.

In an embodiment, the symbols having the same transmission direction type in the each of the symbol cascade blocks include one of: symbols in a downlink transmission direction in the each of the symbol cascade blocks; symbols in the downlink transmission direction and blank time in the each of the symbol cascade blocks; symbols in an uplink transmission direction in the each of the symbol cascade blocks; or symbols in the uplink transmission direction and the blank time in the each of the symbol cascade blocks.

In an embodiment, the symbols having the same transmission direction type in the plurality of sets of wireless signals having different configurations have different lengths.

In an embodiment, the device further includes an obtaining module, which is configured to obtain the lengths of the symbols having the same transmission direction type in the plurality of sets of wireless signals having different configurations in at least one manner of a group consisting of: obtaining, based on a received configuration parameter, the lengths of the symbols in the plurality of sets of wireless signals having different configurations; and obtaining, based on a subcarrier spacing (SCS), lengths of valid symbols among symbols corresponding to the subcarrier spacing (SCS) in the plurality of sets of wireless signals having different configurations, and obtaining the lengths of the corresponding symbols in the plurality of sets of wireless signals having different configurations according to the lengths of the valid symbols, where the length of each symbol is obtained by adding the length of the valid symbol in the each symbol and the length of a prefix.

In an embodiment, the symbols in the each of the plurality of sets of wireless signals having different configurations have at least two different lengths, where in a case where the symbols in the each of the plurality of sets of wireless signals having different configurations have two different lengths, the symbols include long symbols and short symbols, and the plurality of sets of wireless signals have a same proportional relationship between the length of each long symbol and the length of each short symbol.

In an embodiment, the cascading module is further configured to cascade a preset number of symbols in the each of the plurality of sets of wireless signals into the symbol cascade block, where the preset number is the number of symbols of the each of the plurality of sets of wireless signals within a unit time interval and having a basic subcarrier spacing.

In an embodiment, the transmission module is further configured to send the symbol cascade blocks within a unit time interval in sequence.

In an embodiment, the valid symbols are orthogonal frequency division multiplexing (OFDM) symbols.

Another embodiment of the present disclosure further provides a storage medium. The storage medium is configured to store program codes for performing the following steps: in presence of a plurality of sets of wireless signals having different configurations, cascading consecutive symbols in each of the plurality of sets of wireless signals into at least one symbol cascade block, where when lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers; and transmitting symbol cascade blocks of the plurality of sets of wireless signals in a preset order.

Through the present disclosure, consecutive symbols in each set of wireless signals are cascaded into symbol cascade blocks according to a certain proportional relationship, and then the symbol cascade blocks are sequentially transmitted, so that the symbols having various configuration parameters in the same time length can be aligned on the valid symbols. The interference between uplink and downlink is avoided. The system robustness and stability are improved.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

Hereinafter the present disclosure will be described in detail with reference to the drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Method Embodiment

The embodiment provides a method and device for data transmission using a symbol cascade block.

By carefully analyzing FIG. 2, it is found that at the frequency of 15 KHz, the downlink (DL for short) part is taken as a whole and the uplink (UL for short) part is taken as a whole, the interference between uplink and downlink can be solved as long as the DL parts and the UL parts of frame structures having different parameter are respectively aligned.

Figure 3:
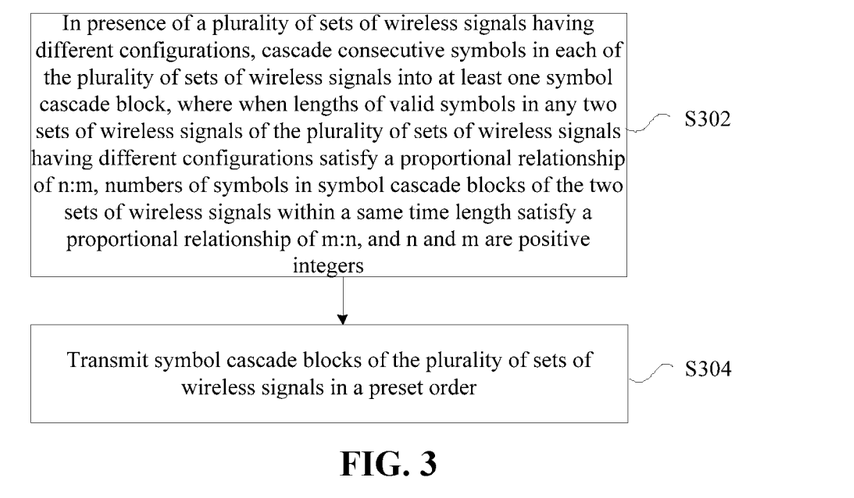
FIG. 3 is a flowchart of a wireless signal transmission method according to an embodiment of the present disclosure.

Based on the above analysis, the embodiment of the present disclosure provides a wireless signal transmission method. FIG. 3 is a flowchart of the wireless signal transmission method according to the embodiment of the present disclosure. As shown in FIG. 3, the process of the method includes the steps described below.

In S302, in presence of a plurality of sets of wireless signals having different configurations, consecutive symbols in each of the plurality of sets of wireless signals are cascaded into at least one symbol cascade block. When lengths of valid symbols in any two sets of wireless signals of the plurality of sets of wireless signals having different configurations satisfy a proportional relationship of n:m, the numbers of symbols in symbol cascade blocks of the two sets of wireless signals within the same time length satisfy a proportional relationship of m:n, and n and m are positive integers.

In S304, symbol cascade blocks of the plurality of sets of wireless signals are transmitted in a preset order.

Through above steps, consecutive symbols in each set of wireless signals are cascaded into symbol cascade blocks according to a certain proportional relationship, and then the symbol cascade blocks are sequentially transmitted, so that the symbols having various configuration parameters in the same time length can be aligned on the valid symbols. The interference between uplink and downlink is avoided. The system robustness and stability are improved.

In an embodiment, the above steps may, but may not necessarily, be executed by a base station or a terminal.

In an embodiment, the above valid symbol may include an OFDM symbol without a cyclic prefix (CP), which is also referred to as a payload.

In an embodiment, symbols in each of the symbol cascade blocks have a same transmission direction type.

In an embodiment, symbols in each of the symbol cascade blocks have a same function type.

In an embodiment, the function type includes one of: a downlink control symbol, a downlink data symbol, an uplink control symbol, or an uplink data symbol.

In an embodiment, the wireless signals having different configurations comprise at least one of: wireless signals having different subcarrier spacings; wireless signals having different symbol lengths; or wireless signals having different cyclic prefix lengths.

In an embodiment, among the wireless signals having different configurations, a relative relationship of the length of each symbol in symbol cascade blocks of a wireless signal having a small subcarrier spacing is the same as a relative relationship of a total length of symbols of the number of a scale factor in symbol cascade blocks of a wireless signal having a large subcarrier spacing.

In an embodiment, the relative relationship may include the following meanings: in a case where a symbol in the symbol cascade blocks having the small subcarrier spacing is a long symbol, and corresponding symbols of the number of the scale factor in the symbol cascade blocks having the large subcarrier spacing are also long symbols; and in a case where a symbol in the symbol cascade blocks having the small subcarrier spacing is a short symbol, and corresponding symbols of the number of the scale factor in the symbol cascade blocks having the large subcarrier spacing are also short symbols.

In an embodiment, the above relative relationship may also include the following meaning: in a case where a symbol in the symbol cascade blocks having the small subcarrier spacing is a long symbol, and at least one corresponding symbol in the symbol cascade blocks having the large subcarrier spacing is also a long symbol.

In an embodiment, the step of cascading the consecutive symbols in the each of the plurality of sets of wireless signals into the symbol cascade block includes: cascading the preset number of symbols in the each of the plurality of sets of wireless signals into the symbol cascade block.

The preset number is the number of symbols of the each of the plurality of sets of wireless signals within a unit time interval and having a basic subcarrier spacing. For example, when the number of CP-OFDM symbols included within a unit time interval and having a basic subcarrier spacing is two, the CP-OFDM symbol cascade blocks in the corresponding each set of the wireless signals having a scaled subcarrier spacing may be cascaded by two CP-OFDM symbols of the same transmission direction type.

In an embodiment, the step of sending the symbol cascade blocks in a preset order includes: sending symbol cascade blocks within a unit time interval (i.e., one interval) in sequence. For example, the CP-OFDM symbol cascade blocks of the downlink transmission direction type in one time interval may be first sent in sequence, and then the CP-OFDM symbol cascade blocks of the uplink transmission direction type in the time interval is sent in sequence.

In an embodiment, a transmission direction type of the symbols in the each of the symbol cascade blocks may be blank time, a downlink symbol or an uplink symbol. That is, the symbols having the same transmission direction type in the each of the symbol cascade blocks include one of:
symbols in a downlink transmission direction in the each of the symbol cascade blocks;
symbols in the downlink transmission direction and blank time in the each of the symbol cascade blocks;
symbols in an uplink transmission direction in the each of the symbol cascade blocks; or symbols in the uplink transmission direction and the blank time in the each of the symbol cascade blocks.

In an embodiment, in presence of a plurality of sets of wireless signals having different configurations, the symbols having the same transmission direction type in the plurality of sets of wireless signals having different configurations have different lengths.

In an embodiment, the plurality of sets of parameters generally include the length of the symbol, or the length of the symbol may also be added by the length of the valid symbol and the length of the prefix in the parameter. The length of the valid symbol is obtained from the subcarrier spacing (SCS). The lengths of the symbols having the same transmission direction type in the plurality of sets of wireless signals having different configurations are obtained in at least one manner of a group consisting of: obtaining, based on a received configuration parameter, the lengths of the symbols in the plurality of sets of wireless signals having different configurations; and obtaining, based on a subcarrier spacing (SCS), lengths of valid symbols among symbols corresponding to the subcarrier spacing (SCS) in the plurality of sets of wireless signals having different configurations, and obtaining the lengths of the corresponding symbols in the plurality of sets of wireless signals having different configurations according to the lengths of the valid symbols, where the length of each symbol is obtained by adding the length of the valid symbol in the each symbol and the length of a prefix.

In an embodiment, the length of at least two or more symbols may exist in the same set of wireless signals (i.e., in any one of the plurality of sets of parameters). In presence of two types of symbols, the lengths of the two types of symbols respectively correspond to a long symbol and a short symbol, and the proportional relationship between the length of the long symbol and the length of the short symbol in each set (i.e., under a plurality of sets of parameter configurations) of wireless signals is the same. The long symbol refers to a symbol corresponding to a long CP, for example, a combination of a long CP and an OPDM symbol, that is, a combination of an extended CP and the OPDM symbol. The short symbol refers to a symbol corresponding to a short CP, for example, a combination of a short CP and an OPDM symbol, that is, a combination of a normal CP and the OPDM symbol.

The following description is made in conjunction with the preferred embodiments, and the following preferred embodiments incorporate the above-mentioned embodiments and preferred embodiments thereof.

Preferred Embodiment

Embodiment 1

A symbol is a cyclic prefix orthogonal frequency division multiplexing (CP-OFDM for short) symbol. A plurality of sets of parameters for describing the CP-OFDM are provided. The valid symbols (that is, an OFDM symbol part carrying valid data (excluding the CP), also referred to as the payload) in the same set of parameters are equal in length. The CP in the same set of parameters has two possible lengths, defined as a long CP and a short CP, respectively. The length of the long CP is greater than the length of the short CP. The lengths of the valid symbols and the prefix CPs in a plurality of sets of parameters are not equal. If the scaling principle is met and the scale factor is m, the length of the valid symbol and the lengths of the long CP and short CP (a set of parameters) with the subcarrier spacing fs after scaling are 1/m the length of the valid symbol and the lengths of the long CP and short CP (the other set of parameters) with the basic subcarrier spacing f0. The m may be a positive integer greater than or equal to 1, or may be a fraction where the numerator is 1 and the denominator is a positive integer, such as ½, ⅓, and ¼.

Symbols in the same set of parameters are cascaded into symbol cascade blocks for transmission. The block (only the downlink part DL Part or the uplink part UL Part is included in the block) is composed of multiple CP-OFDM symbols, and the number of symbols in the block does not exceed the total number of symbols in the subframe or slot of the basic frame structure (subcarrier spacing is f0).

The relative length proportion between each symbol in the block is the same as a relative length proportion between each symbol in a block under the basic frame structure parameter. If only two lengths, the long symbol and the short symbol, are provided, the relative length proportion between the long symbol and the short symbol is the same as a relative length proportion between the long symbol and the short symbol under the basic frame structure parameter.

The lengths of m symbol cascade blocks corresponding to a plurality of sets of parameters in the same time period are consistent.

Figure 4:
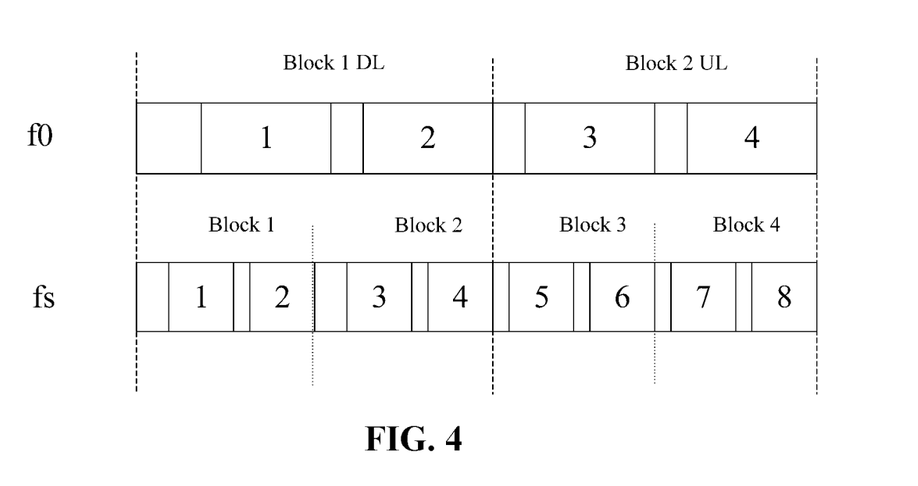
FIG. 4 is a schematic diagram illustrating scaling of blocks formed by cascading symbols according to a preferred embodiment 1 of the present disclosure.

FIG. 4 is a schematic diagram illustrating scaling of blocks formed by cascading symbols according to the preferred embodiment 1 of the present disclosure. As shown in FIG. 4, it is assumed that the basic subcarrier spacing is f0 (corresponding to a set of configurations or parameters, including the length of a valid symbol, the prefix CP, and the like under the subcarrier spacing), and the downlink part and the uplink part respectively have two symbols. The subcarrier spacing after the scaling is fs (corresponding to another set of configurations or parameters, including the length of a valid symbol, the prefix CP, and the like under the subcarrier spacing), fs=2*f0, and the length of the symbol in the set of configurations after the scaling is ½ the length of the symbol in the set of configurations under the basic Subcarrier spacing, and the downlink and the uplink respectively have four symbols. After two symbols of the basic frame structure are cascaded into a block (i.e., symbol cascade block) and then time-compressed with a compression proportion of ½, the presented pattern is shown in FIG. 4. The first and second symbols of the basic frame structure f0 are patterns of a long CP and a short CP. In the same time period after compression, the compressed frame structure is in the form of a combination of a symbol cascade block cascaded by the compressed long CP-OFDM and the short CP-OFDM and another symbol cascade block cascaded by the compressed long CP-OFDM and the short CP-OFDM. The third and fourth symbols of the basic frame structure are patterns of a short CP and a short CP, and the compressed frame structure is a combination of the short CP-OFDM, the short CP-OFDM, the short CP-OFDM and the short CP-OFDM. The relative length proportion between the long CP-OFDM and the short CP-OFDM under fs is the same as the relative length proportion between the long CP-OFDM and the short CP-OFDM under f0, and a total length of the symbol cascade blocks recombined by the long CP-OFDM, the short CP-OFDM, the long CP-OFDM and the short CP-OFDM (symbols 1, 2, 3 and 4) is the same as the length of the symbol parallel blocks (symbols 1 and 2) under the basic frame structure f0.

Generally speaking, in the NR system mentioned in the above solution, when scaling is performed according to different scaling factors, the scaling is performed based on a specific DL, GP, and UL part length reference, that is, the reference type of each part does not change with the scaling The interference between uplink and downlink is avoided. System robustness and stability are improved.

Embodiment 2

The previous embodiment focuses on the alignment for the purpose of solving the interference between uplink the downlink. The solution is also to consider aligning the cascade blocks composed of multiple symbols in the same transmission direction. The embodiment described below is mainly to consider from the perspective of functional normalization of multiple symbols.

A symbol is still a CP-OFDM symbol. A plurality of sets of parameters for describing the CP-OFDM are provided. A valid symbol (excluding the CP) part in the same set of parameters is equal in length. The prefix CP in the same set of parameters has two possible lengths, defined as a long CP and a short CP, respectively. The length of the long CP is greater than the length of the short CP. The plurality of sets of parameters have different lengths of valid symbols and prefix CPs. If the scaling principle is met and the scale factor is m, the length of the valid symbol and the lengths of the long CP and short CP (a set of parameters) with the subcarrier spacing fs after scaling are 1/m the length of the valid symbol and the lengths of the long CP and short CP (the other set of parameters) with the basic subcarrier spacing f0. m may be a positive integer greater than or equal to 1, or may be a fraction where the numerator is 1 and the denominator is a positive integer, such as ½, ⅓, and ¼.

Symbols executing the same function in the same set of parameters are cascaded into a symbol cascade block for transmission, such as a symbol cascade block for only executing downlink control information bearing, a symbol cascade block for only executing downlink data bearing, a symbol cascade block for only executing uplink control information bearing, and a symbol cascade block for only executing uplink data bearing. A block is composed of one or more CP-OFDM symbols, and the number of symbols in the block does not exceed the total number of symbols in the subframe or slot of the basic frame structure (subcarrier spacing is f0).

The relative length proportion between each symbol in the block is the same as a relative length proportion between each symbol in a block under the basic frame structure parameter. If only two lengths, the long symbol and the short symbol, are provided, the relative length proportion between the long symbol and the short symbol is the same as a relative length proportion between the long symbol and the short symbol under the basic frame structure parameter.

Figure 5:
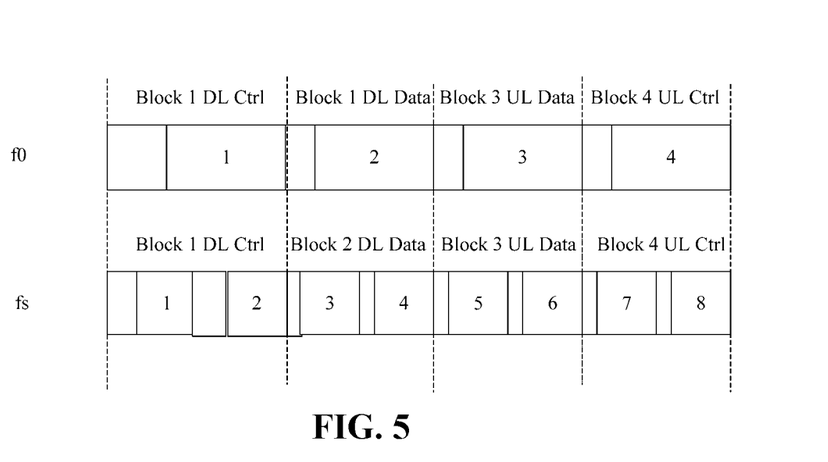
FIG. 5 is a schematic diagram of illustrating scaling of blocks formed by cascading symbols according to a preferred embodiment 2 of the present disclosure.

FIG. 5 is a schematic diagram illustrating scaling of blocks formed by cascading symbols according to the preferred embodiment 2 of the present disclosure. It is assumed that the basic subcarrier spacing is f0 (corresponding to a set of configurations or parameters, including the length of a valid symbol, the prefix CP, and the like under the subcarrier spacing), and the downlink part and the uplink part respectively have two symbols, that is, respectively one downlink control (ctrl) symbol, one downlink data symbol, one uplink ctrl symbol and one uplink data symbol. The subcarrier spacing after the scaling is fs (corresponding to another set of configurations or parameters, including the length of a valid symbol, the prefix CP, and the like under the subcarrier spacing), fs=2*f0, and the length of the symbol in the set of configurations after the scaling is ½ the length of the symbol in the set of configurations under the basic subcarrier spacing. After one symbol of the basic frame structure is cascaded into a block (i.e., symbol cascade block) and then time-compressed with a compression proportion of ½, the presented pattern is shown in FIG. 5. The first symbol (the first block) of the basic frame structure f0 is a pattern of a long CP. In the same time period after compression, the compressed frame structure is a symbol cascade block cascaded by compressed two symbols, a long CP-OFDM and a long CP-OFDM. The second symbol of the basic frame structure f0 is a pattern of a short CP, and in the same time period after compression, the compressed frame structure is a symbol cascade block cascaded by compressed two symbols, a short CP-OFDM and a short CP-OFDM. The third symbol of the base frame structure is a pattern of a short CP, and the compressed frame structure is a combination of a short CP-OFDM and a short CP-OFDM. The fourth symbol of the base frame structure is a pattern of a short CP, and the compressed frame structure is also a combination of a short CP-OFDM and a short CP-OFDM. The fs has the same relative length proportion between the long CP-OFDM and the short CP-OFDM as the f0. The symbol cascade blocks of the long CP-OFDM, the short CP-OFDM, the long CP-OFDM and the short CP-OFDM are symbol 1 and 2, symbol 3 and 4, symbol 5 and 6, and symbol 7 and 8, respectively indicating downlink control, downlink data, uplink data, and uplink control. The lengths of these functional blocks are respectively the same as the lengths of the symbol parallel blocks (symbols 1, 2, 3 and 4) of the basic frame structure f0. A total length of the combination of the functional blocks is the same as a total length of the symbol parallel blocks (symbols 1, 2, 3 and 4) of the base frame structure f0.

It may be concluded from FIG. 5 that such a relative relationship exists between aligned cascade blocks: the relative relationship (i.e., long, short, short . . . relationship) of the lengths of x symbols in a cascade block having large subcarrier spacing (shorter symbol) is the same as the relative relationship of the lengths of y symbols having small subcarrier spacing (longer symbol). x=scaling factor*y. Specifically, if the symbol having the small subcarrier spacing is a long symbol, the corresponding scaling factor symbols having the large subcarrier spacing are also long symbols, and if the symbol having the small sub carrier spacing is a short symbol, the corresponding scaling factor symbols having the large subcarrier spacing are also short symbols. It may be seen from the embodiment that if one symbol in the cascade block having the small subcarrier spacing is a long symbol, correspondingly at least one symbol in the cascade block having the large subcarrier spacing is also a long symbol.

Generally speaking, in the NR system mentioned in the above solution, when scaling is performed according to different scaling factors, the scaling is performed based on length reference of specific functions, such as control and data parts, that is, the reference type function of each part does not change with the scaling System robustness and stability are improved.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to each embodiment of the present disclosure.

Device Embodiment

A wireless signal transmission device is further provided in the embodiment. The device is configured for implementing the above-mentioned embodiments and preferred implementation modes. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 6:
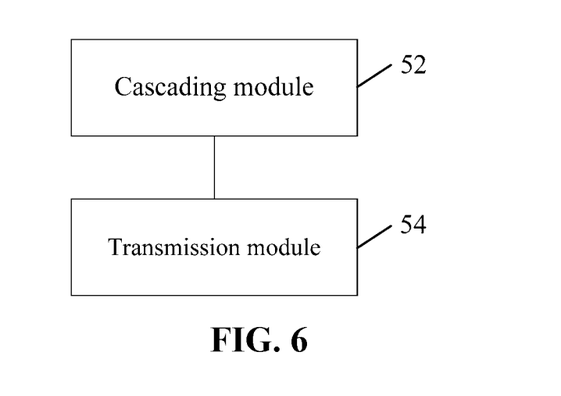
FIG. 6 is a block diagram of a wireless signal transmission device according to an embodiment of the present disclosure.

FIG. 6 is a block diagram of the wireless signal transmission device according to the embodiment of the present disclosure. As shown in FIG. 6, the device includes a cascading module 52 and a transmission module 54.

The cascading module 52 is configured to cascade, in presence of a plurality of sets of wireless signals having different configurations, consecutive symbols in each of the plurality of sets of wireless signals into at least one symbol cascade block. When lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers.

The transmission module 54 is connected to the cascading module 52, and is configured to transmit symbol cascade blocks of the plurality of sets of wireless signals in a preset order.

In an embodiment, the above valid symbol may include an OFDM symbol without a cyclic prefix (CP), which is also referred to as a payload.

In an embodiment, symbols in each of the symbol cascade blocks have a same transmission direction type.

In an embodiment, symbols in each of the symbol cascade blocks have a same function type.

In an embodiment, the function type includes one of: a downlink control symbol, a downlink data symbol, an uplink control symbol, or an uplink data symbol.

In an embodiment, the wireless signals having different configurations comprise at least one of: wireless signals having different subcarrier spacings; wireless signals having different symbol lengths; or wireless signals having different cyclic prefix lengths.

In an embodiment, among the wireless signals having different configurations, a relative relationship of the length of each symbol in symbol cascade blocks of a wireless signal having a small subcarrier spacing is the same as a relative relationship of a total length of symbols of the number of a scale factor in symbol cascade blocks of a wireless signal having a large subcarrier spacing.

In an embodiment, the relative relationship may include: in a case where a symbol in the symbol cascade blocks having the small subcarrier spacing is a long symbol, and corresponding symbols of the number of the scale factor in the symbol cascade blocks having the large subcarrier spacing are also long symbols; and in a case where a symbol in the symbol cascade blocks having the small subcarrier spacing is a short symbol, and corresponding symbols of the number of the scale factor in the symbol cascade blocks having the large subcarrier spacing are also short symbols.

In an embodiment, the relative relationship may include: in a case where a symbol in the symbol cascade blocks having the small subcarrier spacing is a long symbol, and at least one corresponding symbol in the symbol cascade blocks having the large subcarrier spacing is also a long symbol.

In an embodiment, the cascading module 52 may be configured to cascade the consecutive symbols in the each of the plurality of sets of wireless signals into the symbol cascade block. The step includes: cascading the preset number of symbols in the each of the plurality of sets of wireless signals into the symbol cascade block. The preset number is the number of symbols of the each of the plurality of sets of wireless signals within a unit time interval and having a basic subcarrier spacing. For example, when the number of CP-OFDM symbols included within a unit time interval and having a basic subcarrier spacing is two, the CP-OFDM symbol cascade blocks in the corresponding each set of the wireless signals having a scaled subcarrier spacing may be cascaded by two CP-OFDM symbols of the same transmission direction type.

In an embodiment, the transmission module 54 may further be configured to send the symbol cascade blocks within a unit time interval (i.e., a time interval unit (interval)) in sequence. For example, the CP-OFDM symbol cascade blocks of the downlink transmission direction type in one time interval may be first sent in sequence, and then the CP-OFDM symbol cascade blocks of the uplink transmission direction type in the time interval is sent in sequence.

In an embodiment, the symbols having the same transmission direction type in the each of the symbol cascade blocks include one of:
symbols in a downlink transmission direction in the each of the symbol cascade blocks;
symbols in the downlink transmission direction and blank time in the each of the symbol cascade blocks;
symbols in an uplink transmission direction in the each of the symbol cascade blocks; or symbols in the uplink transmission direction and the blank time in the each of the symbol cascade blocks.

In an embodiment, in presence of a plurality of sets of wireless signals having different configurations, the symbols having the same transmission direction type in the plurality of sets of wireless signals having different configurations have different lengths.

In an embodiment, the device further includes an obtaining module. The obtaining module is configured to obtain the lengths of the CP-OFDM symbols having the same transmission direction type in the plurality of sets of wireless signals having different configurations in at least one manner described below.

The lengths of the symbols in the plurality of sets of wireless signals having different configurations are obtained based on a received configuration parameter.

Lengths of valid symbols among symbols corresponding to the subcarrier spacing (SCS) in the plurality of sets of wireless signals having different configurations are obtained based on a subcarrier spacing (SCS). The lengths of the corresponding symbols in the plurality of sets of wireless signals having different configurations are obtained according to the lengths of the valid symbols. The length of each symbol is obtained by adding the length of the valid symbol in the each symbol and the length of a prefix.

In an embodiment, the length of at least two or more symbols may exist in each of the plurality of sets of wireless signals. In presence of two types of symbols, the lengths of the two types of symbols respectively correspond to a long symbol and a short symbol, and the proportional relationship between the length of the long symbol and the length of the short symbol in each set (i.e., under a plurality of sets of parameter configurations) of wireless signals is the same. The long symbol refers to a symbol corresponding to a long CP, for example, a combination of a long CP and an OPDM symbol, that is, a combination of an extended CP and the OPDM symbol. The short symbol refers to a symbol corresponding to a short CP, for example, a combination of a short CP and an OPDM symbol, that is, a combination of a normal CP and the OPDM symbol.

It is to be noted that the various modules described above may be implemented by software or hardware. Implementation by hardware may, but may not necessarily, be performed in the following manner: the various modules described above are located in a same processor, or the various modules described above are located in their respective processors in any combination form.

An embodiment of the present disclosure further provides a storage medium. In an embodiment, the storage medium may be configured to store program codes for executing the steps described below.

In S302, in presence of a plurality of sets of wireless signals having different configurations, consecutive symbols in each of the plurality of sets of wireless signals are cascaded into at least one symbol cascade block. When lengths of valid symbols in any two sets of wireless signals of the plurality of sets of wireless signals having different configurations satisfy a proportional relationship of n:m, the numbers of symbols in symbol cascade blocks of the two sets of wireless signals within the same time length satisfy a proportional relationship of m:n, and n and m are positive integers.

In S304, symbol cascade blocks of the plurality of sets of wireless signals are transmitted in a preset order.

In an embodiment, the storage medium described above may include, but is not limited to, a USB flash drive, a read-only memory (ROM), a random access memory (RAM), a mobile hard disk, a magnetic disk, an optical disk or another medium capable of storing the program codes.

In an embodiment, for specific examples in the embodiment, reference may be made to the examples described in the above-mentioned embodiments and implementation modes, and repetition will not be made herein.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

As described above, the embodiments of the present disclosure provide a wireless signal transmission method and device and have the benefits described below. The interference between uplink and downlink is avoided. The system robustness and stability are improved.

What is claimed is:

1. A wireless signal transmission method, comprising:
   in presence of a plurality of sets of wireless signals having different configurations, cascading consecutive symbols in each of the plurality of sets of wireless signals into at least one symbol cascade block, wherein when lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers; and
   transmitting symbol cascade blocks of the plurality of sets of wireless signals in a preset order;
   wherein symbols in each of the symbol cascade blocks have a same transmission direction type;
   wherein the symbols having the same transmission direction type in the plurality of sets of wireless signals having different configurations have different lengths;
   wherein symbols in each of the symbol cascade blocks have a same function type,
   wherein the function type comprises one of: a downlink control symbol, a downlink data symbol, an uplink control symbol, or an uplink data symbol.

2. The method of claim 1, wherein the wireless signals having different configurations comprise at least one of: wireless signals having different subcarrier spacings; wireless signals having different symbol lengths; or wireless signals having different cyclic prefix lengths.

3. The method of claim 2, wherein among the wireless signals having different configurations, a relative relationship of a length of each symbol in symbol cascade blocks of a wireless signal having a small subcarrier spacing is the same as a relative relationship of a total length of symbols of a number of a scale factor in symbol cascade blocks of a wireless signal having a large subcarrier spacing.

4. The method of claim 3, wherein the relative relationship comprises:
   in a case where a symbol in the symbol cascade blocks having the small subcarrier spacing is a long symbol, and corresponding symbols of the number of the scale factor in the symbol cascade blocks having the large subcarrier spacing are also long symbols; and
   in a case where a symbol in the symbol cascade blocks having the small subcarrier spacing is a short symbol, and corresponding symbols of the number of the scale factor in the symbol cascade blocks having the large subcarrier spacing are also short symbols, or, wherein the relative relationship comprises:
   in a case where a symbol in the symbol cascade blocks having the small subcarrier spacing is a long symbol, and at least one corresponding symbol in the symbol cascade blocks having the large subcarrier spacing is also a long symbol.

5. The method of claim 1, the symbols having the same transmission direction type in the each of the symbol cascade blocks comprise one of:
   symbols in a downlink transmission direction in the each of the symbol cascade blocks;
   symbols in the downlink transmission direction and blank time in the each of the symbol cascade blocks;
   symbols in an uplink transmission direction in the each of the symbol cascade blocks; or symbols in the uplink transmission direction and the blank time in the each of the symbol cascade blocks.

6. The method of claim 1, wherein the lengths of the symbols having the same transmission direction type in the plurality of sets of wireless signals having different configurations are obtained in at least one manner of a group consisting of:

obtaining, based on a received configuration parameter, the lengths of the symbols in the plurality of sets of wireless signals having different configurations; and obtaining, based on a subcarrier spacing (SCS), lengths of valid symbols among symbols corresponding to the subcarrier spacing (SCS) in the plurality of sets of wireless signals having different configurations, and obtaining the lengths of the corresponding symbols in the plurality of sets of wireless signals having different configurations according to the lengths of the valid symbols, wherein a length of each symbol is obtained by adding the length of the valid symbol in the each symbol and a length of a prefix, or, wherein the symbols in the each of the plurality of sets of wireless signals having different configurations have at least two different lengths, wherein in a case where the symbols in the each of the plurality of sets of wireless signals having different configurations have two different lengths, the symbols comprise long symbols and short symbols, and the plurality of sets of wireless signals have a same proportional relationship between the length of each long symbol and the length of each short symbol.

7. The method of claim 1, wherein cascading the consecutive symbols in the each of the plurality of sets of wireless signals into the symbol cascade block comprises: cascading a preset number of symbols in the each of the plurality of sets of wireless signals into the symbol cascade block, wherein the preset number is a number of symbols of the each of the plurality of sets of wireless signals within a unit time interval and having a basic subcarrier spacing, or, wherein transmitting the symbol cascade blocks in the preset order comprises:

sending the symbol cascade blocks within a unit time interval in sequence, or, wherein the valid symbols are orthogonal frequency division multiplexing (OFDM) symbols.

8. A wireless signal transmission device, comprising:
a processor; and
a memory for storing instructions executable by the processor,
wherein the processor is configured to:
cascade, in presence of a plurality of sets of wireless signals having different configurations, consecutive symbols in each of the plurality of sets of wireless signals into at least one symbol cascade block, wherein when lengths of valid symbols in any two sets of wireless signals of the plurality of sets of wireless signals having different configurations satisfy a proportional relationship of n:m, numbers of symbols in symbol cascade blocks of the two sets of wireless signals within a same time length satisfy a proportional relationship of m:n, and n and m are positive integers; and
transmit symbol cascade blocks of the plurality of sets of wireless signals in a preset order;
wherein symbols in each of the symbol cascade blocks have a same transmission direction type;

wherein the symbols having the same transmission direction type in the plurality of sets of wireless signals having different configurations have different lengths;

wherein symbols in each of the symbol cascade blocks have a same function type, wherein the function type comprises one of: a downlink control symbol, a downlink data symbol, an uplink control symbol, or an uplink data symbol.

9. The device of claim 8, wherein the wireless signals having different configurations comprise at least one of: wireless signals having different subcarrier spacings; wireless signals having different symbol lengths; or wireless signals having different cyclic prefix lengths.

10. The device of claim 9, wherein among the wireless signals having different configurations, a relative relationship of a length of each symbol in symbol cascade blocks of a wireless signal having a small subcarrier spacing is the same as a relative relationship of a total length of symbols of a number of a scale factor in symbol cascade blocks of a wireless signal having a large subcarrier spacing.

11. The device of claim 10, wherein the relative relationship comprises:

in a case where a symbol in the symbol cascade blocks having the small subcarrier spacing is a long symbol, and corresponding symbols of the number of the scale factor in the symbol cascade blocks having the large subcarrier spacing are also long symbols; and in a case where a symbol in the symbol cascade blocks having the small subcarrier spacing is a short symbol, and corresponding symbols of the number of the scale factor in the symbol cascade blocks having the large subcarrier spacing are also short symbols, or, wherein the relative relationship comprises:

in a case where a symbol in the symbol cascade blocks having the small subcarrier spacing is a long symbol, and at least one corresponding symbol in the symbol cascade blocks having the large subcarrier spacing is also a long symbol.

12. The device of claim 8, the symbols having the same transmission direction type in the each of the symbol cascade blocks comprise one of:

symbols in a downlink transmission direction in the each of the symbol cascade blocks;

symbols in the downlink transmission direction and blank time in the each of the symbol cascade blocks;

symbols in an uplink transmission direction in the each of the symbol cascade blocks; or symbols in the uplink transmission direction and the blank time in the each of the symbol cascade blocks.

13. The device of claim 8, wherein the processor is further configured to obtain the lengths of the symbols having the same transmission direction type in the plurality of sets of wireless signals having different configurations in at least one manner of a group consisting of:

obtaining, based on a received configuration parameter, the lengths of the symbols in the plurality of sets of wireless signals having different configurations; and obtaining, based on a subcarrier spacing (SCS), lengths of valid symbols among symbols corresponding to the subcarrier spacing (SCS) in the plurality of sets of wireless signals having different configurations, and obtaining the lengths of the corresponding symbols in the plurality of sets of wireless signals having different configurations according to the lengths of the valid symbols, wherein a length of each symbol is obtained by adding the length of the valid symbol in the each symbol and a length of a prefix, or, wherein the symbols in the each of the plurality of sets of wireless signals having different configurations have at least two different lengths, wherein in a case where the symbols in the each of the plurality of sets of wireless signals having different configurations have two different lengths, the symbols comprise long symbols and short symbols, and the plurality of sets of wireless signals have a same proportional relationship between the length of each long symbol and the length of each short symbol.

14. The device of claim 8, wherein the processor is further configured to cascade a preset number of symbols in the each of the plurality of sets of wireless signals into the symbol cascade block, wherein the preset number is a number of symbols of the each of the plurality of sets of wireless signals within a unit time interval and having a basic subcarrier spacing, or, wherein processor is further configured to send the symbol cascade blocks within a unit time interval in sequence, or, wherein the valid symbols are orthogonal frequency division multiplexing (OFDM) symbols.

\* \* \* \* \*